Dec. 20, 1955 E. S. WILSON 2,727,685

PERFORATED RECORD SCANNING DEVICE

Filed Nov. 15, 1952 2 Sheets-Sheet 1

INVENTOR
EDWARD S. WILSON
BY Robert S. Dunham
ATTORNEY

PERFORATED RECORD SCANNING DEVICE

Filed Nov. 15, 1952 2 Sheets-Sheet 2

INVENTOR
EDWARD S. WILSON
BY Robert S. Dunham
ATTORNEY

United States Patent Office 2,727,685
Patented Dec. 20, 1955

2,727,685

PERFORATED RECORD SCANNING DEVICE

Edward S. Wilson, Poughkeepsie, N. Y., assignor to International Business Machines Corporation, New York, N. Y., a corporation of New York Application November 15, 1952, Serial No. 320,752

6 Claims. (Cl. 235—61.11)

This invention relates to a perforated record scanning device. In its particular aspect, the invention relates to a perforated record scanning device which takes advantage of the luminescence persistence of certain luminescent substances.

It has been proposed heretofore to scan perforated record cards with the aid of photo-conductive devices such as conventional photo-electric cells. Such prior devices demanded an instantaneous read-out of the information sensed in the perforated record because the excitation of the photo-conductive element, and consequently the electrical conductivity thereof, is coincident in point of time with the beam of light by which it is excited.

For some record scanning operations it is advantageous to have an appreciable time lag between the sensing of the record perforation and the utilization of the pulse that may be produced as a result of such sensing. This advantage may be attained by utilizing a sensitive element which has the property of luminescence as well as photo-conductivity.

Accordingly, this invention in its general aspect contemplates a perforated record scanning device in which is employed a plurality of mutually insulated luminescent photo-conductive bodies of normally high electrical resistance which are excitable to luminescence under control of perforations in a perforated record body. The persistence of luminescence maintains the photo-conductive body in a conductive state for a sufficient length of time to permit means herein provided successively to impress an electric pulse on the luminescent photo-conductive bodies for energizing some means responsive to the electric pulse passing through one or more of the excited bodies.

Figure 1:
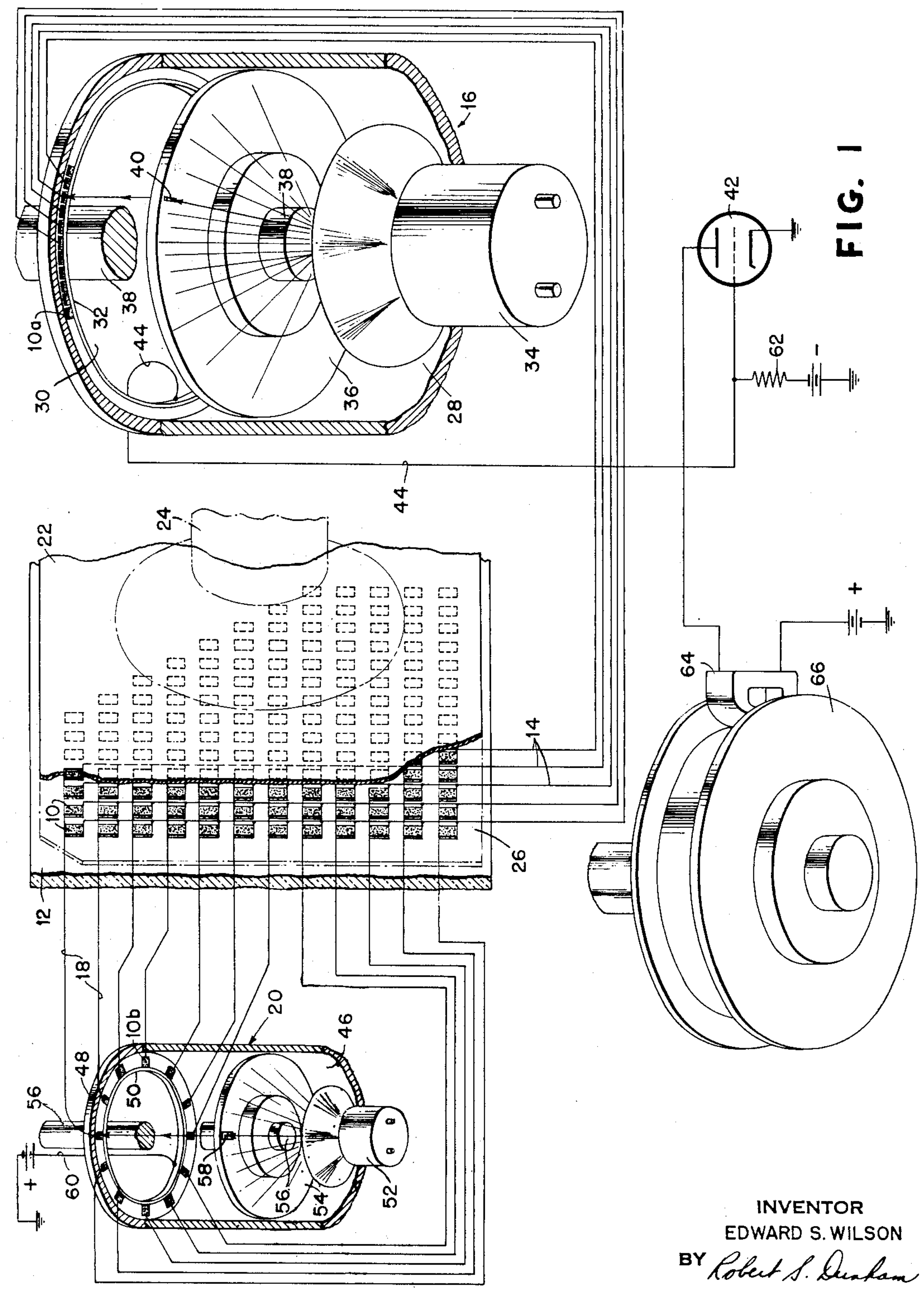
Figure 2:
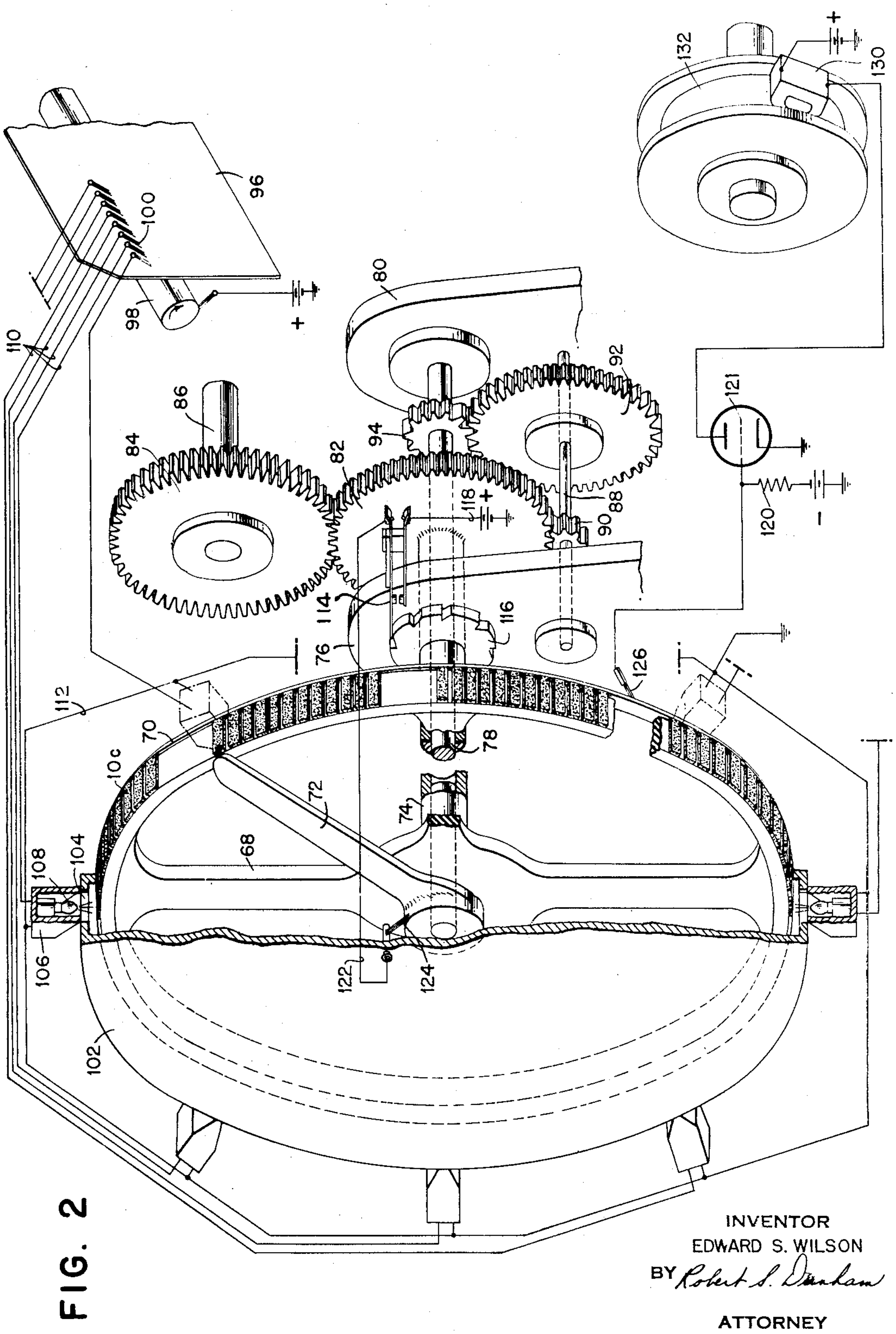

The specific mechanism for scanning perforated records according to the concept of this invention may assume a variety of forms which will suggest themselves to those skilled in the art. However, for the purpose of disclosing the invention in concerete form reference may be had to the accompanying drawings in which:

Fig. 1 is a diagrammatic illustration of one form of record scanning device in which the luminescent photo-conductive bodies are arranged in a matrix corresponding to index points of a record body; and Fig. 2 is a diagrammatic illustration of a different form of record scanning device in which the luminescent photo-conductive bodies are arranged about the periphery of a rotatable drum in groups, each corresponding to the index points of a record card column.

The luminescent bodies, which may be referred to herein as cells, wherever used in the devices of this invention or in other forms thereof may be of substantially the same form and composition. A unit cell comprises a suitable base coated with substances having photo-conductive and photo-luminescent properties. Photo-luminescent substances are contemplated in particular inasmuch as it is intended herein to excite the cells by means of light beams. The photo-conductive material should be capable of a large change in electrical resistance per unit change in light, and the photo-luminescent material should have a high efficiency between excitation by a beam of light and reemission of its luminescence. Naturally, the output of the luminescent material must be in a frequency range to which the photo-conductive material is sensitive.

A suitable cell may be made as follows: One face of a suitable insulating base, glass for example, may be coated with a photo-conductive material, lead sulphide for example, and a thin, transparent coating of a luminescent material, one of the phosphors for example, may then be coated over the photo-conductive layer. Alternately, the photo-conductive and the photo-luminescent materials may be first mixed and the mixture thereof may be applied to the insulating base in a single coating operation.

When a cell of this character is exposed to a suitable source of light or an electric field, the phosphor will become luminescent and, upon removal of the light beam, will continue to glow, the duration of the luminescence depending upon the decay time of the luminescent material employed.

The electrical resistance of the cell will be lowered when it is exposed to light and will not revert to its original status as soon as the light is removed, but its rate of return to its dark value will be a function of the decay time of the luminescent material combined with the photo-conductive material. Thus, the cell is, in effect, a storage device.

In Fig. 1 of the drawings the luminescent photo-conductive cells 10 are arranged on a suitable base 12 in such position as to correspond to the index points of a conventional punched statistical card. All of the cells of each column are connected to a common conductor 14, and each of the column conductors 14 is connected into a column commutator 16. Each of the cells in a row is in turn connected to a common conductor 18, and each of the row conductors 18 is connected into a row commutator 20.

The cells 10 are enclosed in a suitable housing which is effective to shield them from light. In one wall 22 of the housing is a lamp 24 which is adapted to flash whenever a perforated card 26 (shown in dot and dash outline in Fig. 1) is in registration with the cell matrix. The rays from the lamp 24 will pass through any card perforation and excite the cell directly thereunder respectively, the remaining cells being shielded from the light by the overlying card.

The data represented by the card perforations is now in effect stored in the corresponding excited cells, and since such cells are now conductive they can be used to condition read-out circuits. Commutators 16 and 20 are used for this purpose.

The column commutator 16 is housed in an opaque cylindrical casing 28 which has end walls, of which only the end wall 30 is shown. On the end wall 30 are mounted the cells **10*a* are equal in number to the cells 10 of a row (80 for example). Each of the common column conductors 14 is connected to a commutator cell 10*a*. Each of the cells 10*a* is also electrically connected to a common conductor 32. A lamp 34 is mounted in the opposite end wall of the casing 28. Interposed between the lamp 34 and the cells 10*a* is a rotary disc 36, which is mounted on a shaft 38 journaled for rotation in the end wall 30. The disc 36 has a single slot 40 located at the periphery thereof a distance from the center of the disc which is the same as that of the cells 10*a***.

The common conductor 32 is connected to the control grid of a vacuum tube 42 by means of a connection 44.

The row commutator 20 is housed in an opaque cylindrical casing 46 which has end walls, of which only the end wall 48 is shown. On the end wall 48 are mounted the cells 10_b_ which are equal in number to the cells 10 of a column (12 for example). Each of the common row conductors 18 is connected to a commutator cell 10_b_. Each of the cells 10_b_ is also electrically connected to a common conductor 50. A lamp 52 is mounted in the opposite end wall of the casing 46. Interposed between the lamp 52 and the cells 10_b_ is a rotary disc 54 which is mounted on a shaft 56 journaled for rotation in the end wall 48. The disc 54 has a single slot 58 located at the periphery thereof a distance from the center of the disc which is the same as that of the cells 10_b_.

The common conductor 50 is connected to a lead 60 so that an electric pulse may be applied between it and a resistance 62 in the control grid circuit of the vacuum tube 42.

Assuming that a perforated card sensed over the cells 10 had a hole in the upper left hand corner thereof, the cell 10 thereunder will be excited when the lamp 24 is flashed and will be thereby rendered conductive. When the disc 54 in the commutator 20 is turned to illuminate the cell 10_b_ connected to the first row of cells 10, and if at the same time the disc 36 in the commutator 16 is turned to illuminate the cell 10_a_ connected to the first column of cells 10, cells 10_a_ and 10_b_ being also conductive, a circuit will be completed to permit passage of a pulse applied to lead 60. The pulse will travel from lead 60, common conductor 50, through excited cell 10_b_, common row connector 18, the excited cell 10, common column conductor 14, excited cell 10_a_, cmmon conductor 32, and connector 44 to the control grid of the vacuum tube 42. Firing of the vacuum tube 42 may energize any suitable recording device such as a magnetic recording head 64, for example, to cause a record to be made on a magnetic drum 66.

It may be noted that the disc 36 is rotated at a greater speed than the disc 54. This is due to the fact that there are normally more columns on a record card than there are rows. For a card having twelve rows and eighty columns, the disc 54 will be rotated one-eighteenth of a revolution for each revolution of the disc 36. In this manner the entire matrix of cells 10 will be scanned during each complete revolution of the discs 36 and 54. In other words, when the disc 54 is in one position, the disc 36 will make a complete revolution. The disc 54 will then move through its second position and the disc 36 will make another complete revolution. Scanning of the cells 10 continues in this manner, in row by row sequence, until all the cells have been sensed. The function of the device, as described, permits a simultaneous read-in of information from a punched card and the read-out of the information in serial order.

The device according to Fig. 2 of the drawings is also adapted for the parallel read-in of information from a punched card and for the serial read-out of such information, thus providing for a transformation from parallel to series form. In Fig. 2 a drum 68 has a multiplicity of cells 10_c_ arranged about its periphery. Herein there are eight groups of cells, each one of which is made up of twelve separate cells. This arrangement exemplifies a device capable of reading information from a punched card field that is eight columns wide. The column capacity of the drum will be suited to particular requirements. Each group of cells are preferably spaced from each other to provide time for read-out and other functions.

One end of each cell 10_c_ is in electrical contact with a common conductor 70 while the opposite end of each is arranged in a plane for contact by a rotating read-out arm 72.

The drum 68 is mounted to rotate with a hollow shaft 74 journalled for rotation in a bearing block 76. Within the shaft 74 is mounted a rotatable shaft 78, to one end of which is fixed the read-out arm 72 and which has its other end journaled in a bearing block 80. Accordingly, both the drum 68 and the read-out arm are adapted for independent rotation. It is expedient to rotate the read-out arm 72 at a rate thirty-two times as great as the drum 68. This is accomplished through a gear train.

The hollow shaft 74 has fixed thereto a gear 82 which is driven from a gear 84 on a drive shaft 86. Below the gear 82 is a countershaft 88, the respective ends of which are journaled in bearing blocks 76 and 80. Fixed to the countershaft is a pinion 90 and a larger gear 92. The gear 92 is in engagement with a pinion 94 attached to the rotatable shaft 78. The pinion 90 is in engagement with and is driven from the gear 82.

A conventional punched statistical card 96 is adapted to be read in a conventional card reading station including an electrically charged reading roll 98 and reading brushes 100. The rate at which the conventional card feed mechanism and the shaft 86 are driven is synchronized so that as the card 96 is fed under the reading brushes 100 from index point to index point, the drum 68 will index about its axis in related order. The ratio of the gears 82, 90, 92 and 94, however, is such that the shaft 78 will be driven thirty-two times as fast.

The drum 68 is enclosed in an opaque housing 102 which has a series of equally spaced peripheral slots 104, there being one such slot for each group of cells 10_c_. Over each slot is fixed a lamp housing 106 which opens into its related slot and in which is mounted a lamp 108. Each lamp 108 is in a circuit including a reading brush 100, a connector 110, and a common grounded conductor 112. Accordingly, when a brush 100 encounters a hole in a card 96 it will come into contact with the live roll 98, causing the lamp 108 in that particular circuit to be momentarily energized. The particular cell 10_c_ under the slot 104 at the moment of energization will be excited, causing it to become luminescent and maintain its conductivity with some persistence.

Let it be assumed that each operative cycle of the device in Fig. 2 consists of sixteen points, with twelve cycle points for recording from the twelve index points of the card columns being scanned and that the read-out arm 72 makes one revolution for each four cycle points of the drum 68. There are thus eight complete card cycles of sixteen points each for each complete revolution of the drum. At the start of every card feed cycle, in the first twelve points of the cycle, information will be read from the card 96 into the cells 10_c_ of the drum. During this twelve point period, the arm 72 will make three complete revolutions, but as the cam contact 114 is open during this period, the read-out apparatus is inoperative. At the end of these twelve cycle points, a cam contact 114 will close under control of a cam 116 rotating with the hollow shaft 74. The cam 116 is so shaped as to permit the contact 114 to close once every four revolutions of the read-out arm 72. Thereby, the read-out arm 72 will be in such position as to start scanning the cell 10_c_ related to the first bit of information in the first column when the cam contact 114 closes, and at the end of the fourth cycle point, it will have made a complete revolution during which to read out the last bit of information in the last column of the field being scanned. Read-in and read-out operations follow each other in continuous sequence.

An electric read-out pulse is applied across a lead 118 of the cam contact 114 and a resistance 120 in the control grid circuit of a vacuum tube 121. This pulse is applied to the read-out arm 72 by means of a connector 122 and a brush 124. During the read-out part of an operative cycle, the cam contact 114 will be closed and the arm 72 will be charged. Thereafter, whenever the arm 72 encounters an excited cell 10_c_, a circuit will be completed from the lead 118, through the cam contact 114 and the connector 122 to the read-out arm 72, through the excited cell 10_c_, the common conductor 70, a brush 126, and into the control grid of the vacuum tube 121. When the tube 121 fires, it energizes a recording device such as a magnetic recording head 130 which records the card data on a magnetic recording drum 132.

The invention has been described in two embodiments for the purpose of illustration, but the concept taught herein may be applied in such other forms as fall within the scope of the following claims.

What is claimed is:

1. A perforated record scanning device, comprising a plurality of mutually insulated bodies, each including both luminescent and photo-conductive materials and normally of relatively high electrical resistance when not exposed to or excited by light, means under control of perforations in a perforated record for exciting to luminescence those bodies corresponding respectively to perforations in a record, whereby the electrical resistance of such excited luminescent photo-conductive bodies is reduced, means for successively impressing an electrical pulse on said bodies, and means responsive to an electric pulse passing by electrical conductivity through such bodies rendered luminous under record control due to the reduction of the electrical resistance thereof respectively.

2. A perforated record scanning device in accordance with claim 1, in which said means for exciting to luminescence those bodies corresponding respectively to perforations in a record comprises at least one light source, and means under control of perforations in a record for exposing to light rays from said light source those bodies only which correspond respectively to perforations in said record.

3. A perforated record scanning device, comprising a plurality of mutually insulated luminescent photo-conductive bodies normally of relatively high electrical resistance arranged in a matrix corresponding to index points of a record body, means for superimposing a perforated record in corresponding registration with said bodies, means for exciting to luminescence those bodies corresponding to perforations in a record superimposed thereon whereby the electrical resistance of such luminescent photo-conductive bodies is reduced, means for successively impressing an electrical pulse on said bodies, and means responsive to an electric pulse passing through such bodies rendered luminous under record control.

4. A perforated record scanning device, comprising a plurality of mutually insulated luminescent photo-conductive bodies normally of relatively high electrical resistance arranged in a matrix corresponding to index points of a record body, means for superimposing a perforated record body in corresponding registration with said bodies, a light source, means for directing rays from said light source through a perforated record body superimposed on said bodies for exciting to luminescence those bodies corresponding to perforations in a record whereby the electrical resistance of such luminescent photo-conductive bodies is reduced, means for successively impressing an electrical pulse on said bodies, and means responsive to an electric pulse passing through such bodies rendered luminous under record control.

5. A perforated record scanning device, comprising a plurality of mutually insulated bodies, each including both luminescent and photo-conductive materials and normally of relatively high electrical resistance when not exposed to or excited by light, said bodies being arranged about a drum in groups each corresponding to a column of index points of a record body, means for sensing perforations in a record body, means under control of said perforation sensing means for exciting to luminescence these bodies corresponding respectively to perforations in a record, whereby the electrical resistance of such excited luminescent photo-conductive bodies is reduced, means for successively impressing an electrical pulse on said bodies, and means responsive to an electric pulse passing by electrical conduction through such bodies rendered luminous under record control due to the reduction of the electrical resistance thereof respectively.

6. A perforated record scanning device in accordance with claim 5, in which said means for exciting to luminescence those bodies corresponding respectively to perforations in a record comprise a light source associated with each of said groups, means for rotating said drum in respect to said light sources in synchronism with the sensing of a record body by said sensing means, and means under control of said record sensing means for energizing said light sources whenever a perforation in a record is sensed to excite to luminescence those bodies only corresponding respectively to perforations in said record.

References Cited in the file of this patent

UNITED STATES PATENTS

| | | |
|---|---|---|
| 2,203,353 | Goldmark | June 4, 1940 |
| 2,629,827 | Eckert, Jr., et al. | Feb. 24, 1953 |